Patented Apr. 23, 1935

1,998,538

UNITED STATES PATENT OFFICE 1,998,538

PROCESS FOR THE MANUFACTURE OF 1-CHLORO-ETHYLBENZENES

Hans Finkelstein and Willi Krey, Uerdingen, Germany, assignors to I. G. Farbenindustrie Aktiengesellschaft, Frankfort-on-the-Main, Germany No Drawing. Application November 18, 1932, Serial No. 643,299. In Germany November 24, 1931

15 Claims. (Cl. 260—160)

The present invention relates to the manufacture of 1-chloro-ethylbenzene, substituted 1-chloro-ethylbenzenes or homologues of 1-chloro-ethylbenzene from styrene, substituted styrenes or homologues of styrene and gaseous hydrogen chloride by causing gaseous hydrogen chloride to act on styrene, substituted styrenes or homologues of styrene or solutions of the same in indifferent solvents in the presence of catalytically acting quantities of substances, forming with hydrogen chloride loose addition compounds, that is to say addition compounds, which again readily split up into the components thereof.

The formation of 1-chloro-ethylbenzene by the addition of hydrogen chloride to styrene in accordance with the equation:

$$C_6H_5-CH=CH_2 + HCl \rightarrow C_6H_5-CHCl-CH_3$$

is known.

By passing gaseous hydrogen chloride into styrene or solutions of styrene in indifferent solvents the said addition proceeds but slowly. An increase of the reaction velocity does not take place on heating, since the solubility of hydrogen chloride in styrene or in hydrocarbon mixtures containing styrene decreases greatly with increasing temperature.

In accordance with the present invention the reaction velocity of hydrogen chloride and styrene is very greatly increased by the addition of substances, capable of forming loose addition compounds with hydrogen chloride, which again readily split into the components thereof. The substances to be employed need be present only in relatively small, catalytically acting quantities, for example, in an amount of 0.1–15% of the styrene.

Substances of various classes can be employed as catalysts, insofar as they satisfy the stipulated conditions, for example, alcohols, such as methyl alcohol, ethyl alcohol, propyl alcohol, butyl alcohol, phenyl ethyl acohol, phenyl propyl alcohol or mixtures of these alcohols, ketones, such as acetone, ethyl methyl ketone, diethyl ketone, ethyl propyl ketone, as well as aliphatic and aromatic amines, such as trimethyl amine, triethyl amine, dibutyl amine, aniline, methyl aniline, dimethyl aniline, diethyl aniline, dimethyl toluidine, furthermore pyridine, picoline, chinoline and also ethers, such as diethyl ether, dipropyl ether, propyl butyl ether etc. These substances may be employed as such or in the form of their addition compounds with hydrogen chloride.

Water likewise acts catalytically provided that care is taken to procure the finest state of division, for example, by agitating and especially by addition of an emulsifying agent, for example, by the addition of the sulfonic acids of alkylated naphthalenes.

In addition to styrene the process is applicable to substituted styrenes, such as halogenated styrenes, for example, the isomeric chloro styrenes and bromo styrenes, furthermore homologues of styrene, for example, the alkylated styrenes, such as the isomeric methyl styrenes, ethyl styrenes and propyl styrenes etc.

The temperature during the reaction may vary according to the conditions. We have obtained good results with temperatures above 0°, more particularly with temperatures ranging from about 5° to about 50° C. At temperatures of above 40–50° C. it is in some cases advisable to employ a reflux condenser or to work in a closed vessel under elevated pressure in order to prevent the volatilization of components of the reaction mixture.

The process is applicable with particular advantage to mixtures or solutions in which in addition to the styrene, substituted styrenes or homologues of styrene other substances are present, for example, aromatic hydrocarbons not containing unsaturated side chains, such as benzene, toluene, xylene etc., and consequently the process of the present invention may serve to separate the styrene from such mixtures. Raw materials of this kind are for example the fractions boiling between 140–160° of crude benzene (solvent naphtha) obtainable from coal tar or from coal gas or the so-called drip oil, which separates from water gas, carburetted by means of oil gas, wherein styrene and possibly homologues of styrene are present.

The process is further illustrated by the following examples without, however, restricting the invention to the particular quantities, temperatures or other conditions.

Example 1

A solution of 97 parts by weight of styrene in 903 parts by weight of the technical mixture of isomeric xylenes is mixed with 5 parts by weight of dimethylaniline. Hydrogen chloride is introduced into this mixture at room temperature until the increase in weight amounts to about 50 parts which requires about 16 hours. The dimethylaniline, which first separates as the hydrochloride in the form of a fine turbidity, soon redissolves as the poly hydrochloride. The temperature rises somewhat during the introduction of the hydrogen chloride. The crude reaction product is freed from dimethylaniline hydrochloride and excess hydrochloric acid by washing with a small quantity of water and is then fractionated in vacuo. After distilling over the unchanged xylene 125 parts by weight of pure 1-chloro-ethylbenzene are obtained.

Example 2

The dimethylaniline specified in Example 1 is replaced by the same quantity of methyl alcohol or butyl alcohol and the process is carried out as there described. When methyl alcohol has been added stirring must be resorted to to ensure that the methyl alcoholic hydrochloric acid, which separates in a fine state of division, remains in suspension in the hydrocarbon mixture. When employing butyl alcohol this does not appear to be necessary. The before mentioned quantity of 1-chloro-ethylbenzene is obtained by fractional distillation from the reaction product. The duration of the reaction amounts to about 16–18 hours.

The reaction velocity may be increased by employing larger quantities of the catalytically acting substance. Thus it is possible to obtain the same result already in 10 to 12 hours in the example described above, if instead of 5 parts of methyl alcohol 10 parts of methyl alcohol are employed.

Example 3

A solution of 104 parts by weight of styrene in 896 parts by weight of the technical mixture of isomeric xylenes is emulsified with 5 parts of water by the addition of 1 part by weight of a mixture of equal parts by weight of dibutyl naphthalene sulfonic acid and polyglycerine. Hydrogen chloride is introduced into this mixture at room temperature for about 14 hours. The temperature rises somewhat during the introduction of the hydrogen chloride. The crude reaction product is freed from the excess hydrochloric acid by washing with a small quantity of water and is then fractionated in vacuo. After distilling over the unchanged xylene 98 parts by weight of pure 1-chloro-ethylbenzene are obtained, that are about 70% of the amount calculated. In the absence of water only 50% of the amount calculated are obtained.

Example 4

A solution of 150 parts by weight of styrene (chlorinated in the nucleus) in 850 parts by weight of benzene is mixed with 5 g. acetone. Hydrogen chloride is introduced into this mixture at room temperature for about 12 hours. The crude reaction product is freed from acetone and excess hydrochloric acid by washing with a small quantity of water. 180 parts by weight of 1-chloro-ethylchlorobenzene are obtained by fractional distillation from the reaction product.

In the following claims the term 1-chloro-ethylbenzenes is to denote 1-chloro-ethylbenzene, halogenated 1-chloro-ethylbenzenes and homologues of 1-chloro-ethylbenzene:

We claim:

1. The process for the manufacture of 1-chloro-ethylbenzenes, which comprises causing gaseous hydrogen chloride to react on a material selected from the group consisting of styrene, halogenated styrenes and homologues of styrene in the presence of catalytically acting quantities of substances, forming with hydrogen chloride addition compounds which can be readily split up again.

2. The process for the manufacture of 1-chloro-ethylbenzene, which comprises causing gaseous hydrogen chloride to react on styrene in the presence of catalytically acting quantities of substances, forming with hydrogen chloride addition compounds which can be readily split up again.

3. The process for the manufacture of 1-chloro-ethylbenzene, which comprises causing gaseous hydrogen chloride to react on a solution of styrene in an inert organic solvent in the presence of catalytically acting quantities of substances, forming with hydrogen chloride addition compounds which can be readily split up again.

4. The process for the manufacture of 1-chloro-ethylbenzene, which comprises causing gaseous hydrogen chloride to react on a hydrocarbon fraction containing styrene in the presence of catalytically acting quantities of substances, forming with hydrogen chloride addition compounds which can be readily split up again.

5. The process for the manufacture of 1-chloro-ethylbenzene, which comprises causing gaseous hydrogen chloride to react on crude solvent naphtha from coal tar in the presence of catalytically acting quantities of substances, forming with hydrogen chloride addition compounds which can be readily split up again.

6. The process for the manufacture of 1-chloro-ethylbenzene, which comprises causing gaseous hydrogen chloride to react on crude solvent naphtha from coal tar in the presence of catalytically acting quantities of water.

7. The process for the manufacture of 1-chloro-ethylbenzene, which comprises causing gaseous hydrogen chloride to react on crude solvent naphtha from coal tar in the presence of catalytically acting quantities of water at temperatures above 0° C.

8. The process for the manufacture of 1-chloro-ethylbenzene, which comprises causing gaseous hydrogen chloride to react on crude solvent naphtha from coal tar in the presence of catalytically acting quantities of water at a temperature from about 5° to about 50° C.

9. The process for the manufacture of 1-chloro-ethylbenzene, which comprises causing gaseous hydrogen chloride to react on crude solvent naphtha from coal tar in the presence of catalytically acting quantities of an organic substance forming with hydrogen chloride an addition compound which can be readily split up again.

10. The process for the manufacture of 1-chloro-ethylbenzene, which comprises causing gaseous hydrogen chloride to react on crude solvent naphtha from coal tar in the presence of catalytically acting quantities of dimethylaniline.

11. The process for the manufacture of 1-chloro-ethylbenzene, which comprises causing gaseous hydrogen chloride to react on crude solvent naphtha from coal tar in the presence of catalytically acting quantities of dimethylaniline at temperatures above 0° C.

12. The process for the manufacture of 1-chloro-ethylbenzene, which comprises causing gaseous hydrogen chloride to react on crude solvent naphtha from coal tar in the presence of catalytically acting quantities of dimethylaniline at a temperature from about 5° to about 50° C.

13. The process for the manufacture of 1-chloro-ethylbenzene, which comprises causing gaseous hydrogen chloride to react on crude solvent naphtha from coal tar in the presence of catalytically acting quantities of methyl alcohol.

14. The process for the manufacture of 1-chloro-ethylbenzene, which comprises causing gaseous hydrogen chloride to react on crude solvent naphtha from coal tar in the presence of catalytically acting quantities of methyl alcohol at temperatures above 0° C.

15. The process for the manufacture of 1-chloro-ethylbenzene, which comprises causing gaseous hydrogen chloride to react on crude solvent naphtha from coal tar in the presence of catalytically acting quantities of methyl alcohol at a temperature from about 5° to about 50° C.

HANS FINKELSTEIN.
WILLI KREY.